April 19, 1927.
P. B. CAMP
BRAKE MECHANISM
Filed Aug. 6, 1926
1,624,924
2 Sheets-Sheet 1
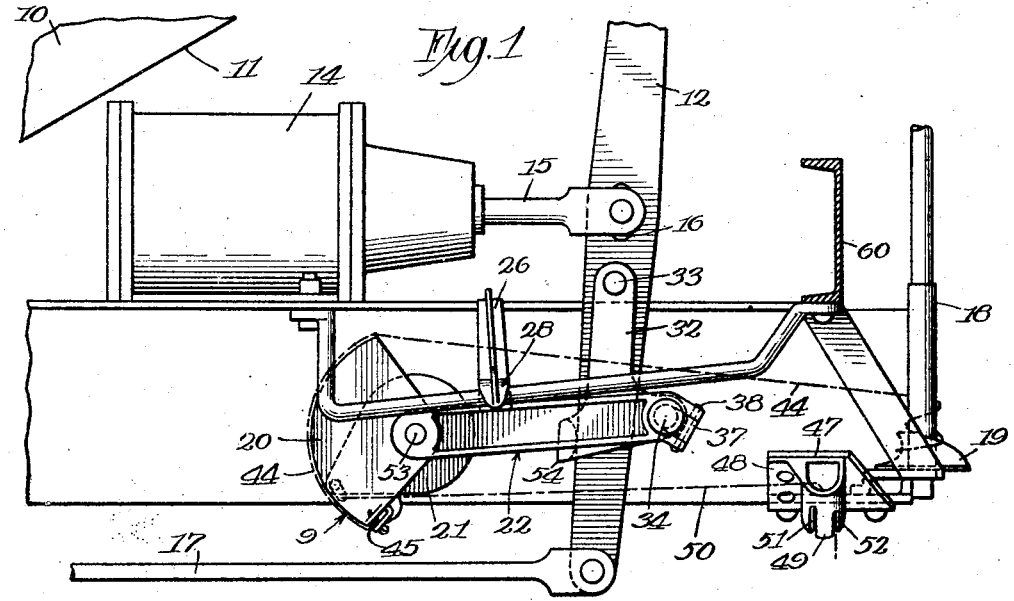

April 19, 1927.                         1,624,924
P. B. CAMP
BRAKE MECHANISM
Filed Aug. 6, 1926         2 Sheets-Sheet 2
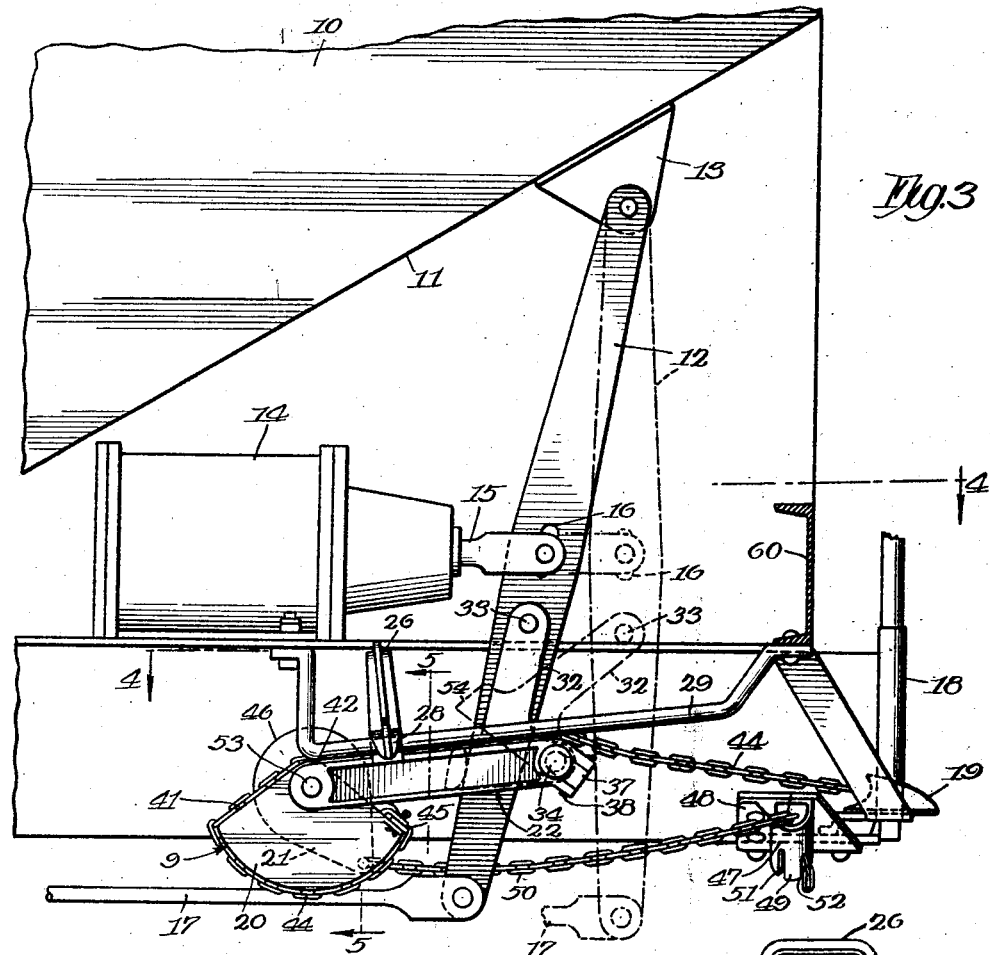
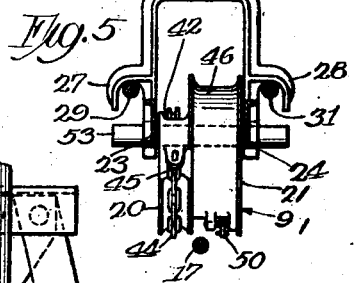
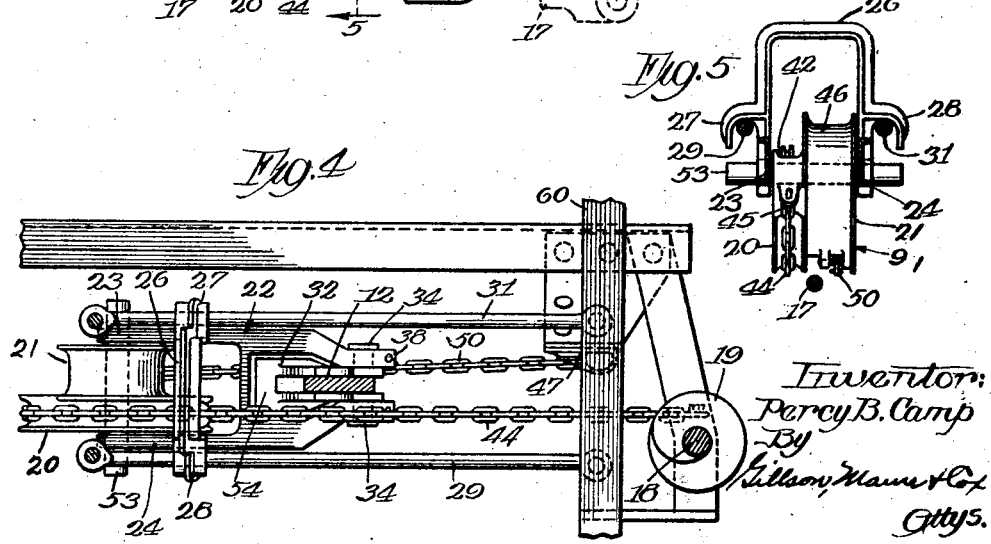
Inventor:
Percy B. Camp
By
Gilson, Mann & Cox
Attys.

Patented Apr. 19, 1927.

1,624,924

UNITED STATES PATENT OFFICE.

PERCY B. CAMP, OF MAYWOOD, ILLINOIS, ASSIGNOR TO UNIVERSAL DRAFT GEAR ATTACHMENT CO., A CORPORATION OF ILLINOIS.

BRAKE MECHANISM.

Application filed August 6, 1926. Serial No. 127,572.

This invention relates to railway brakes, and more particularly to brake operating mechanism for railway hopper cars.

One of the objects of the invention is the provision of new and improved brake operating mechanism that occupies a minimum amount of space and is so constructed that the weight of the manually operated portion of the structure will tend to hold the brake shoes in released position.

Another object of the invention is the provision of a new and improved power and brake operating mechanism in which the parts are so constructed that the power operating mechanism may be employed independently of the hand operating mechanism.

A still further object of the invention is the provision of a new and improved brake operating mechanism that is simple and rugged in construction, efficient in operation, composed of few moving parts, and that is not likely to become broken or get out of order.

Other and further objects and advantages of the invention will appear from the following description taken in connection with the accompanying drawings, in which—

Fig. 1 is a side elevation of a portion of a hopper car showing my invention in position thereon, with parts broken away and parts in section, with the brake operating mechanism in brake setting position;

Fig. 2 is a diagrammatic view of a truck and brake mechanism;

Fig. 3 is a view similar to Fig. 1, showing the mechanism in brake releasing position;

Fig. 4 is a horizontal section on line 4—4 of Fig. 3;

Fig. 5 is a section on line 5—5 of Fig. 3;

Fig. 6 is a perspective view of the jaw member;

Fig. 7 is a perspective view of the yoke member; and

Fig. 8 is a perspective view of the multiplying lever.

Owing to the limited space available beneath hopper cars it is extremely difficult to arrange brake operating mechanism beneath the same so that it may be operated either by power or by hand. The present invention contemplates a construction in which the power operating mechanism is unincumbered in its operation by the hand operated attachment.

Reference now being had to the drawings in which the same reference characters designate the same parts throughout the drawings, the numeral 10 designates a railway car, 11 the inclined bottom wall of the hopper portion of the car, and 12 the cylinder lever which is pivoted to the bracket 13 secured to the upper portion of said wall. The brake cylinder is shown at 14 and its push rod 15 is operatively connected to the lever 12 as by means of the pin and slot connection 16, the slot permitting a relative vertical movement of the lever due to its oscillation.

The lever 12 is so mounted that it may swing from the full line position shown in Fig. 3 through the dotted line position shown in said figure into engagement with the cross member 60. While the brake shoes are new the lever 12 will move but a short distance past the dotted line position shown in said figure but as they become worn, the lever will move nearer and nearer to the transverse member 60. In any event, the angular movement of the lever 12 will be comparatively small so that in the application of the brakes, the line of movement of the push rod is about normal to said lever whereby the maximum lever effect is obtained in setting the brakes.

A brake rod 17 is connected at one end to the brake lever 40 and at its other end to the lower end of the cylinder lever 12 whereby when the push rod 15 is forced outward, the brake rod 17 will be moved to apply the brake shoes 30 to the wheels in the usual manner.

It is desirable that means be provided for operating the brakes independently by hand. In the form of the device selected to illustrate one embodiment of the invention the hand operated mechanism is connected to the brake lever 12 for operating the same and comprises the usual brake staff 18 and spiral winding drum 19. An expansible and contractible connection is provided between the brake staff 18 and the lever 12. As shown, this connection comprises what for convenience of description will be termed a multiplying lever 9 having the two arms 20 and 21, and rotatably mounted in a jaw member 22. The arm 20 will be termed the staff arm and the arm 21 the anchor arm. These arms are preferably rigidly connected together and are rotatably mounted in what will be termed the inner end of the jaw member 22.

The jaw member 22 comprises the two side members 23 and 24 which may be united by the connector member 25 and by the arched member 26. The member 26 is arched to permit the rotation of the lever 9. It is provided with laterally and downwardly extending lugs 27 and 28 for engaging the inclined supporting bars 29 and 31 which are rigidly secured to the underframing of the car and which are adapted to support the multiplying lever.

The front end of the jaw member 22 is supported from the lever 12 in such manner that the lever 12 may be moved to brake applying position by the push rod 15 without affecting the manually operated multiplying lever. As shown, this is accomplished by providing a hanger or yoke member 32 which straddles the lever 12 and is pivoted to the same as at 33. The yoke member is provided at each side thereof with outwardly extending alined trunnions 34 which are adapted to be pivoted to the ends 35 and 36 of the members 23 and 24 of the jaw 22, see Figs. 1 and 6. For convenience of assembly, and in order to permanently hold the parts assembled, and to avoid the use of detachable members in connecting the parts which would likely become accidentally detached and lost, the trunnions 34 may be provided with heads permanently connected to the yoke member. In order to do this, the outer ends of the jaw member are slotted, and after they are slid on to the trunnions 34, blocks 37, see Figs. 1 and 3, are inserted in the outer ends of the slots and rigidly secured therein by suitable means as the rivets or bolts 38.

The staff arm 20 of the multiplying lever is preferably though not necessarily in the form of a segment having a comparatively long radius and provided with a substantially radial leading face 41 which merges into a drum surface 42 of comparatively short radius. The segment, face and drum are provided with a groove 43 for receiving the staff chain 44 which is secured at one end to the spiral drum 19, and its other end extends about the drum 42 and segmental arm 20 and is secured to said arm as at 45. The arm 21 merges into a grooved drum surface 46 having a radius shorter than said arm. An anchor chain 50 has one end secured to said arm, and has its opposite end adjustably secured to an anchor member 47.

The arm 21 is arranged at an angle to the leading face 41 of the arm 20 whereby during the initial movement of the multiplying lever, the staff cable will be operating on what may be termed the short arm of the lever, and the anchor cable on the long arm of the lever, and vice versa during the final movement of the brake operating mechanism.

The anchor member 47 comprises a plate 48 for securing the anchor to the underframing of the car. Rigidly mounted on the plate 48 is a vertically arranged sleeve 49 having the lower portion of its wall provided with open slots 51 and 52 for receiving a link of the chain or cable 50 which is threaded through said sleeve. The slot 51 is longer than the slot 52 but the difference in length is less than the length of one of the links whereby a fine adjustment in the effective length of chain or cable 50 may be effected.

By providing the two levers 20 and 21 and so arranging them that one of the cables will be disposed along one side of the lever 12 and the other on the other side of said lever, there will be no tendency of the jaw member to rotate horizontally, which would probably be the case were a single reversible lever employed with both cables on the same side of the lever 12.

The axle 53 on which the double lever 20, 21 is rotatably mounted, is extended at each end thereof in order that the same may engage the bars 29 and 31 should the jaw member tend to raise during the application of the hand operated brake mechanism.

The connecting portion 54 of the yoke 32 is adapted to engage the lever 12 and move the same in the direction of the brake staff when said staff is operated.

In the operation of the brake by power, the lever 12 is forced forwardly by the push rod 15, the hanger or yoke 32 being pivoted at 33 will swing counter clockwise until the pivots 33, 34 and 53 come into alinement, without otherwise affecting the hand operated mechanism. When the brake shoes are released the weight of the yoke member and the hand operated mechanism will tend to assist the brake releasing movement of the lever 12 and will tend to hold the brake shoes out of contact with the wheels.

In applying the brakes by hand power, the brake staff is rotated whereupon the staff cable operating on the shorter radius of the drum 42 will rapidly rotate the multiplying lever, thus causing the arm 21 to take up the slack very rapidly during the initial operation in applying the brakes. During the final movement in setting the brakes, the cable 44 will be operating on the segment 20 of long radius and the anchor cable will be in engagement with the drum surface 46 and consequently the brakes may be set with powerful leverage.

When the brakes are released, the multiplying lever and associated parts will be caused to slide downward along the rods 29 and 31 by the vibration incident to the movement of the car.

I claim as my invention:

1. In a brake mechanism for railway cars, a brake staff, a brake lever, a contractible and expansible connection between said staff and lever comprising a cylinder lever, a multiplying lever, and means for movably connecting said multiplying lever to said cylinder lever.

2. In a brake operating mechanism for railway cars, a brake staff, a brake lever, an expansible and contractible connection between said staff and lever, said connection comprising a cylinder lever, a yoke pivotally connected to said cylinder lever, and a multiplying lever associated with said yoke for operating said yoke and cylinder lever.

3. In a brake mechanism for railway cars, a cylinder lever, a yoke straddling said lever and pivoted thereto, a jaw member pivoted to said yoke, a multiplying lever journaled in said jaw member, a brake staff, an anchor member and a flexible member between said multiplying lever and said staff and anchor member.

4. In combination, a hopper car having an inclined wall, a cylinder lever pivoted at its upper end, a brake lever, means for connecting the lower end of said cylinder lever to said brake lever, a push rod for operating said cylinder lever, an inclined guide, a jaw member slidably mounted on said guide, a multiplying lever journaled in one end of said jaw member, a yoke member straddling said cylinder lever and pivoted thereto, means for pivotally connecting said jaw member to said yoke member, a brake staff, an anchor member, and flexible means between said multiplying lever and said staff and anchor.

5. A brake operating mechanism for a hopper car comprising a cylinder lever pivoted at one end to said car, a brake rod connected to the opposite end of said lever, a push rod connected to said lever between said ends, a pair of inclined supporting rods, a jaw member slidably mounted on said rods, means for movably connecting said jaw to said lever, a brake staff, a brake lever, and expansible and contractable means between said brake staff and brake lever, said means comprising a multiplying lever mounted rotatably in said jaw member.

6. In a brake operating mechanism for railway cars, a brake lever, power operated means including a cylinder lever for operating said brake lever, a brake staff and means for operatively connecting said staff and lever, said means including a multiplying lever and means for movably connecting said multiplying lever to said cylinder lever, whereby said cylinder lever may be operated without moving said multiplying lever.

7. In a railway brake operating mechanism for a hopper car, a cylinder lever pivoted to the inclined wall of said car, a brake rod pivoted to said lever, a push rod for operating said lever, a yoke pivoted to said lever and straddling the same, inclined supporting members, a jaw member slidably mounted on said inclined members and pivotally connected to said yoke member, a multiplying lever pivoted in said yoke member, said multiplying lever comprising a staff arm and an anchor arm, each merging into a drum surface of short radius, a brake staff, a cable secured to said staff and to said staff arm, and adapted to engage said drum surface during the initial movement in applying the brakes, an anchor member and a cable adjustably secured to said anchor member and having its opposite end secured to said anchor arm and adapted to engage the drum of said arm during the final movement in applying the brakes.

8. A jaw member for a railway brake operating mechanism comprising a pair of members, an arched brace connected to said members and outwardly and downwardly extending supports rigidly connected to said members, each end of said members being formed to engage journal members.

9. An attachment for railway brake mechanism comprising a yoke member adapted to be pivoted to a cylinder lever, a jaw member pivoted to said yoke member, and a multiplying lever pivoted in said jaw member.

In testimony whereof I affix my signature.

PERCY B. CAMP.